US012752439B2

(12) United States Patent
Aggarwal

(10) Patent No.: US 12,752,439 B2
(45) Date of Patent: Oct. 6, 2026

(54) NON-CONTACT SUCTION CUP DEVICE WITH FLOW RECYCLING

(71) Applicant: WCB ROBOTICS INC., Dover, DE (US)

(72) Inventor: Ujjawal Aggarwal, Lucknow (IN)

(73) Assignee: WCB ROBOTICS INC., Dover, DE (US)

( * ) Notice: Subject to any disclaimer, the term of this patent is extended or adjusted under 35 U.S.C. 154(b) by 1101 days.

(21) Appl. No.: 17/879,332

(22) Filed: Aug. 2, 2022

(65) Prior Publication Data

US 2023/0037818 A1 Feb. 9, 2023

(30) Foreign Application Priority Data

Aug. 3, 2021 (IN) ............................. 202141035015

(51) Int. Cl.
*B25J 15/06* (2006.01)

(52) U.S. Cl.
CPC ................................. *B25J 15/0683* (2013.01)

(58) Field of Classification Search
CPC .............. B25J 15/0683; B25J 15/0616; B65G 2249/045; B66C 1/0231
See application file for complete search history.

(56) References Cited

U.S. PATENT DOCUMENTS

| | | | | |
|---|---|---|---|---|
| 10,670,046 | B2 | 6/2020 | Aggarwal | |
| 10,889,007 | B2 * | 1/2021 | Reinhold | B65G 47/91 |
| 11,110,614 | B2 * | 9/2021 | Quast | B25J 15/0616 |
| 2006/0144624 | A1 | 7/2006 | Clark, Jr. et al. | |
| 2011/0192665 | A1 | 8/2011 | Chen | |
| 2020/0216271 | A1 * | 7/2020 | Chou | B65G 49/067 |
| 2020/0247628 | A1 * | 8/2020 | Wade | B65H 3/0816 |

* cited by examiner

*Primary Examiner* — Stephen A Vu
(74) *Attorney, Agent, or Firm* — McCormick, Paulding & Huber PLLC

(57) ABSTRACT

A non-contact suction cup device (100) with flow recycling. The device is based on the recycling flow of fluid through one or more passage(s) (12) provided inside a suction cup chamber (51). The device further optionally includes a flow diverter (4) configured to divert the flow of fluid, and suction means (5) either directly or indirectly attached with the suction cup of the device (100), configured to suck or draw the fluid (11) from the periphery (52). The said passage (12) allow part of fluid to recirculate within the device chamber, hence causing a recycling effect on fluid used to create suction, which provides lower acoustic noise and higher energy efficiency.

17 Claims, 7 Drawing Sheets

B-B

A-A

NON-CONTACT SUCTION CUP DEVICE WITH FLOW RECYCLING

CROSS-REFERENCE RELATED TO APPLICATION

This application claims foreign priority benefits under U.S.C. § 119 from Indian Patent Application No. 202141035015 filed Aug. 3, 2021, the content of which is hereby incorporated by reference in its entirety.

TECHNICAL FIELD

The present invention relates to a suction cup device. Particularly, the invention relates to a non-contact suction cup device with flow recycling. More particularly, the present invention discloses the design and construction of an energy efficient suction cup device which does not need to contact with the suction surface, wherein the fluid flow recycling enables the said device to achieve higher efficiency, to reduce acoustic noise, and to perform better. The applications of above said suction cup device of present invention are in the field of climber robots, other mobile robots or toys for slanted, vertical or upside-down surfaces, and as a manipulator to pick up objects for various purposes in semiconductor industry and others, and in other devices that need to create suction using a fan without a physical seal between the sucked surface and suction cup. An airplane pushback tractor may need such device to increase traction while pushing airplanes around.

BACKGROUND

Fluid-based suction technology is used in various places for various purposes. Although the use of suction is known in art, the devices of known arts have some disadvantages as well lacking to provide an energy efficient device.

Publication US 20060144624 A1 (Clark, J R. et al.) discloses a wall racer toy vehicle which uses underside body shaped like a venturi tube to create high speed flow under the device which in turn creates suction. However, this method often produces very inefficient suction.

Publication US 20110192665 A1 discloses a non-contact lifting and locomotion device using pressurized air, wherein the device works on the principal of Bernoulli, where a large portion of the under surface as a flat surface is used and this prior art device as well lacks to provide an energy efficient device.

All the known arts and/or above-mentioned prior arts in the domain of non-contact suction cups have limited energy efficiency. Non-contact systems are robust, can move on smooth as well as rough surfaces, use simpler motion mechanics (can be driven like a car). But these systems suffer from one downside, they are very energy hungry. Hence, an improvement in energy efficiency is always good. In case a system does not need energy efficiency improvement but improved robustness, one may increase clearance of suction cup from sucked surface to improve robustness and use the energy efficiency improvement to maintain same energy consumption.

U.S. Pat. No. 10,670,046 B2 (Granted to Applicant of present invention) discloses a high flow low pressure suction device using specific turbulence zones near perimeters. The device uses the concept of turbulence to create a pressure drop at the perimeter of an arrangement made for the suction device whereas in the interior of the device the geometry ensures negligible change in flow speed and hence reduce flow energy losses. Although the above patent of Applicant provides an efficient suction device, there still exists a need to reduce the energy losses and to provide an improved non-contact suction device which is highly energy efficient. Also, the previous invention had a mechanical limit on how large it could be made. This is because it was highly unstable and hence needed mechanical stiffness to counteract this. For a very large design with a lot of suction, it might become very difficult to provide a sufficiently stiff construction.

To this end, the present invention provides and discloses a device which is designed with an intention to improve energy efficiency while keeping the other advantages. The energy efficient device of present invention avoids the above highlighted problems in the devices of prior arts, and as a solution provides energy efficient non-contact suction device, wherein the device only has a flat under surface in acceleration zone which is a very small part of the overall underbody. The rest of the underbody especially the diffusion zone does not have a flat under surface and hence the undersurface in conjugation with the sucked surface does not form a venturi duct. In fact, it exactly opposite to how a venturi duct acts, slowing down air instead of speeding it up.

Further, only some designs among known prior arts are stable systems (can be used as a picking instrument without contact with picked object), whereas the device of present invention can be tuned to work as a stable system too, at the same time being an energy efficient suction device.

SUMMARY

The principal objective of the present invention is to provide a non-contact suction cup device with flow recycling.

Another object of the invention is to provide an improved design and structure of a non-contact suction cup device/system and method therefor with higher energy efficiency.

Another object of the invention is to provide a design of a non-contact suction device/system with superior reliability for use in robots in the area of climbing, semiconductor industry, and other suitable applications based on or involving non-contact suction-based adherence or picking.

A further object of the invention is to provide a robust non-contact suction device which can work on smooth as well as on rough surface texture.

Accordingly, in one aspect the invention provides a non-contact suction cup device with flow recycling. In one embodiment, the invention provides a non-contact suction cup device (100) with flow recycling, wherein the device comprises:

- a suction cup with an outer shell (2);
- optionally, one or more flow diverter(s) (4);
- one or more suction means (5);
- a chamber (51) formed at one side of the suction cup, facing a surface (1) to be sucked by action of fluid flow enabling adherence of the suction cup device (100) onto the surface (1), and the other side of the suction cup forms the outer shell (2) of the device;
- wherein the chamber (51) of the suction cup comprises one or more passage(s) (12) that allow a portion of suction fluid to recirculate within the chamber (51), hence causing a recycling effect on fluid used to create suction;
- wherein, the passage (12) comprises one or more split point(s) (6) inside the suction cup chamber (51) that acts as fluid inlet of the passage (12), and one or more merge point(s) (8) at outer periphery (52) of the suction cup chamber (51) that acts as fluid outlet of the passage (12);

wherein, in operation of the device (100), a main fluid flow (11) from the end of outer periphery (52) enters inside the suction cup chamber (51) and at said split point (6), the main fluid flow (11) splits into parts forming:

(i) a secondary fluid flow path (11B) that recirculates said portion of suction fluid through said one or more passage(s) (12), and (ii) a primary fluid flow path (11A) that flows out other portion of suction fluid outside the device through exhaust (23).

The above said non-contact suction cup device, wherein the said one or more split point(s) (6) of recycle passage(s) (12) within the chamber (51) is/are provided in place(s)/position(s) in between the suction means (5) and the merge point (8).

The above said non-contact suction cup device, wherein the said one or more passage(s) (12) of the suction cup comprises a single passage, or multiple passages in cascaded system, or multiple separate tubes/ducts.

In one embodiment, the invention provides a non-contact suction cup device, wherein the said one or more passage(s) (12) of the suction cup comprises one or more flow passage gap(s) formed in between the outer shell (2) and inner shell (3), wherein the shells (2,3) are sandwiched with a gap in between.

In another embodiment, the invention provides a non-contact suction cup device, wherein the said one or more passage(s) (12) of the suction cup comprises separate tubes/ducts (22) used to create the said recycling flow passage (12).

In another embodiment, the invention is provided with an additional special exhaust duct (15) which redirects the exhaust from suction means (5) to a location close to the inlet of the suction device.

In another embodiment, the invention further provides an additional flexible skirt (16) on its periphery wherein, this skirt collapses around a large obstacle hence allowing the suction system to go over larger obstacles than the gap between the suction cup and the sucked surface, while continuing to use advantages offered by flow recycling.

In another aspect the invention provides a method for non-contact suction using a cup device (100), wherein the method comprises:

providing one or more passage(s) (12) in chamber (51), that allow a portion of suction fluid to recirculate within the chamber (51), hence causing a recycling effect on fluid used to create suction;

wherein, when the one or more suction means (5) conjugated with the suction cup is operated and function to create suction, a main fluid flow (11) from the end of outer periphery (52) enters inside the suction cup chamber (51), diverted by the flow diverter (4) and at split point (6), the main fluid flow (11) splits into parts forming:

(i) a secondary fluid flow path (11B), wherein a portion of fluid enters into the passage (12) via the inlet at split point (6), flowing there through exits out from the passage (12) via the outlet at merge point (8) where the said portion of fluid merges, and is mixed with the main fluid flow (11) which continues to flow and thus a portion of main suction fluid flow (11) recirculates through said one or more passage(s) (12); and (ii) a primary fluid flow path (11A) that flows out other portion of suction fluid outside the device through exhaust (23) provided at the suction means attachment (13).

The above said method, wherein the said one or more passage(s) (12) of the suction cup comprises a single passage, or multiple passages in cascaded system, or multiple separate tubes/ducts.

The above said non-contact suction cup device and method therefor, wherein, the said one or more suction means (5) comprises one or more apparatus capable of creating suction when conjugated with the suction cup, and are configured to suck or draw the fluid (11) from the outer periphery (52) of the device (100) into the chamber (51) of suction cup; and the said flow diverter (4) is provided inside the chamber (51) and configured to divert the flow of fluid (11) flowing below the inner shell (3) starting from a region from outer periphery (52) to a region between inner shell (3) and flow diverter (4).

The above said non-contact suction cup device and method therefor, wherein the device first reduces pressure in the acceleration zone (9) and then finally increases pressure in the diffusion zone (10).

The above said non-contact suction cup device and method therefor, wherein the device first reduces pressure in the acceleration zone (9) and then finally increases pressure in the diffusion zone (10) but may optionally add a short venturi zone before flow diverter.

The above said non-contact suction cup device and method therefor, wherein the fluid (11) comprises air or liquid or slurries or any mixture thereof capable to create pressure and suction.

The above said non-contact suction cup device and method therefor, wherein the shape of suction cup can be a shape selected from circular, oval or polygonal or like.

The above said non-contact suction cup device and method therefor, wherein said one or more suction means (5) is/are apparatus capable of creating suction, selected from fan(s), jet(s) or like, is conjugated with the suction cup either by:

(a) direct attachment, by attaching suction means (5) with the suction means attachment (13) of the suction cup, or (b) indirect attachment, wherein the suction means (5) is provided in a suction pipe or tubular means (14) and then conjugating the suctioning end of pipe or tubular means (14) with the suction means attachment (13);

and wherein the suction means (5) can be placed in any orientation with respect to device (100).

In one embodiment, the axis (7) of the suction means (5) such as fan(s) or jet(s) and the axis (7) of the device (100) are coaxial.

In another embodiment the axis (7) of the suction means (5) such as the fan(s) or jet(s) and the axis (7) of the device (100) are off-axis.

The above said non-contact suction cup device and method therefor, wherein, the recycling fluid flow passage (12) may comprise one or more fin like structures (20) within the recycle passage which provide support to the inner shell (3);

the flow diverter (4) may comprise one or more support fin(s) (21) to connect to the suction means attachment (13) or outer shell (2) of the suction cup device (100).

The above said non-contact suction cup device and method therefor, wherein the said one or more recycled-flow passages (12) may be provided with fan(s) and/or jet(s) to add momentum to recycling flow wherein the fans/jets may use external source or comprises holes linking recycle passage to the environment hence using the lower pressure in recycle flow passage to drive the fans/jets.

The non-contact suction device/system/apparatus of the invention has superior performance, higher energy efficiency and lower acoustic noise that can work with any fluids and including gasses (e.g., air), liquids (e.g., water), slurries or any combination thereof; and that can be used to suck, hold, move and lift and an object and to adhere to a surface; and the device performs robustly in situations of varying roughness and smooth surface texture.

An improved, energy efficient Non-Contact Suction Cup Device (100/100*a*/100*b*/100*c*/100*d*/100*e*/100*f*) with flow recycling and method therefor as described in the description below, as shown in FIGS. 1-11 and as claimed in appended claims.

BRIEF DESCRIPTION OF THE DRAWINGS

The drawings described herein are intended to provide a further understanding of the invention and are intended to be a part of the invention. However, the drawings as shown are representative for illustration and are non-limiting the scope of the invention. In the drawings:

FIG. 5(*a*) shows the partial back view of suction cup device (100*b*).

FIG. 5(*b*) shows the side view of suction cup device (100*b*).

FIG. 5(*c*) shows the top view of suction cup device (100*b*).

FIG. 5(*d*) shows the section view of FIG. 5(*c*) along plane A-A.

FIG. 5(*e*) shows the section view across plane B-B.

FIG. 5(*f*) shows another top view with hidden edges shown, of the suction cup device (100*b*) of same device as shown in FIG. 5(*c*).

FIG. 5(*g*) shows the isometric view of the suction cup device (100*b*).

FIG. 6(*a*) shows the side view, FIG. 6(*b*) shows the top view, and FIG. 6(*c*) shows the section view along A-A of FIG. 6(*b*).

DETAILED DESCRIPTION

Figure 1:
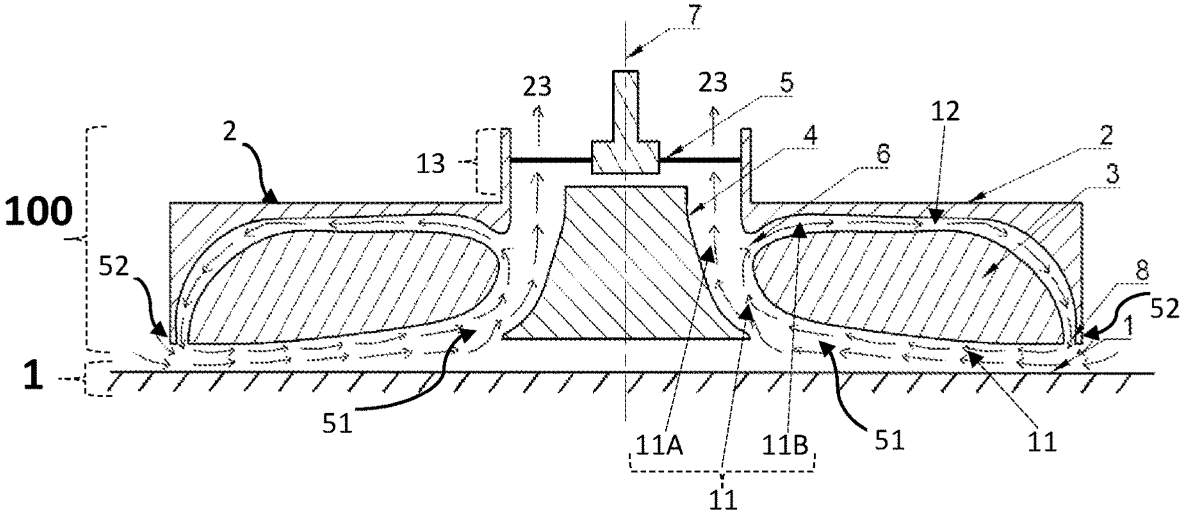
FIG. 1 shows the cross-section view of the Non-Contact Suction Cup Device (100) which represents the simplified preferred embodiment (Embodiment-I) with fluid flow pattern represented by flowing arrows.

The present invention discloses and describes a non-contact suction cup device with flow recycling. The present invention discloses a novel and improved non-contact low pressure suction device which is energy efficient. Design and construction of novel, improved energy efficient suction cup devices are described which do not need to contact with the suction surface, wherein the fluid flow recycling via one or more passage(s) enables the said devices to achieve higher efficiency, to reduce acoustic noise and to achieve better performance.

Typically, a non-contact suction cup device relies on using moving fluid on the body of the suction device, often sand-witched between the body of the suction device and the sucked surface. The fluid is often accelerated by causing a constriction of area to cause a reduction is pressure due to Bernoulli's principle. This low pressure on the underbody coupled with the atmospheric pressure causes a suction force on the suction cup. This invention uses the same principle to create suction force, however the specialized implementation by way of providing recycling flow passage(s) allowing flow recycling within the interior of the suction cup device results in greater efficiency, increased stability and improved acoustic performance.

As stated above, the device uses a novel method of flow recycling of the sucked fluid using one or more recycle passage(s) which recirculate(s) part/portion/fraction of the sucked fluid inside the chamber formed one side of the suction cup (inner side that faces the surface to be sucked). The recycle passage(s) can be formed in any shape, which is capable of maintaining the basic principle and purpose of the passage to serve for the suction device forming higher suction and making the device energy efficient. The passage (s) within the chamber may be a single passage or may be with multiple passages optionally in cascaded system or may be with plurality of separate passages using separate ducts/ tubes. This novel and/or new configuration of suction cup is more energy efficient.

In a generalized embodiment the present invention provides a non-contact suction cup device (100) with flow recycling which can be used against a surface i.e. sucked surface (1). The surface (1) may be smooth or rough surface or a textured surface or presence of combination of surfaces as stated above, wherein suction cup of device comprises one or more passage(s) that allow a part/fraction of suction fluid to recirculate within the chamber, hence causing a recycling effect on fluid used to create suction.

The device basically comprises a suction cup, wherein one side of the cup forms a suction cup chamber wherein fluid flows from outside periphery area of cup and part of fluid recirculates through the passage(s) within the chamber and other part of fluid flows out and exits outside without recirculating. The other side of suction cup forms the back side surface of suction cup of device (where suction means is provided). The shape of suction cup can be in any shape like circular, oval or polygonal or like, more preferably circular shape. In one embodiment the suction cup is circular. In one embodiment the suction cup is oval. In one embodiment the suction cup is polygonal such as rectangular.

The generalized embodiment is formed and described by revolving the cross section along the axis. In the generalized embodiment of present invention, the suction cup comprises a suction chamber and therein fluid flow passage(s) is created between an outer shell and an inner shell. In the center of the chamber the device may optionally comprise a flow diverter. The device further may comprise suction means which may be any suction means suitable and capable to create suction (i.e. pull low pressure fluid from the suction cup), which may be attached/conjugated with the suction cup either directly or indirectly. The suction means can also be placed inside a separate pipe/tube (which may be flexible) and then attached with the exhaust provided at other side of the device so that suction can be created inside the cup chamber. In an another embodiment, the suction means can be one or more fans and/or jets, which may be placed coaxially inline with the axis of device or may be placed off-axis, with an angle with respect to axis of the device. Further, the suction means can be centrifugal blower or impeller or likewise. The recycle passage comprises inlet and outlet, wherein the inlet (at split point) can be provided anywhere inside the suction cup chamber in the flow path between suction means or exhaust and the merge point. In one preferred embodiment (FIG. 1), the passage inlet at split point is placed close to system outflow (exhaust of suction cup) which gives maximum advantage.

Figure 10:
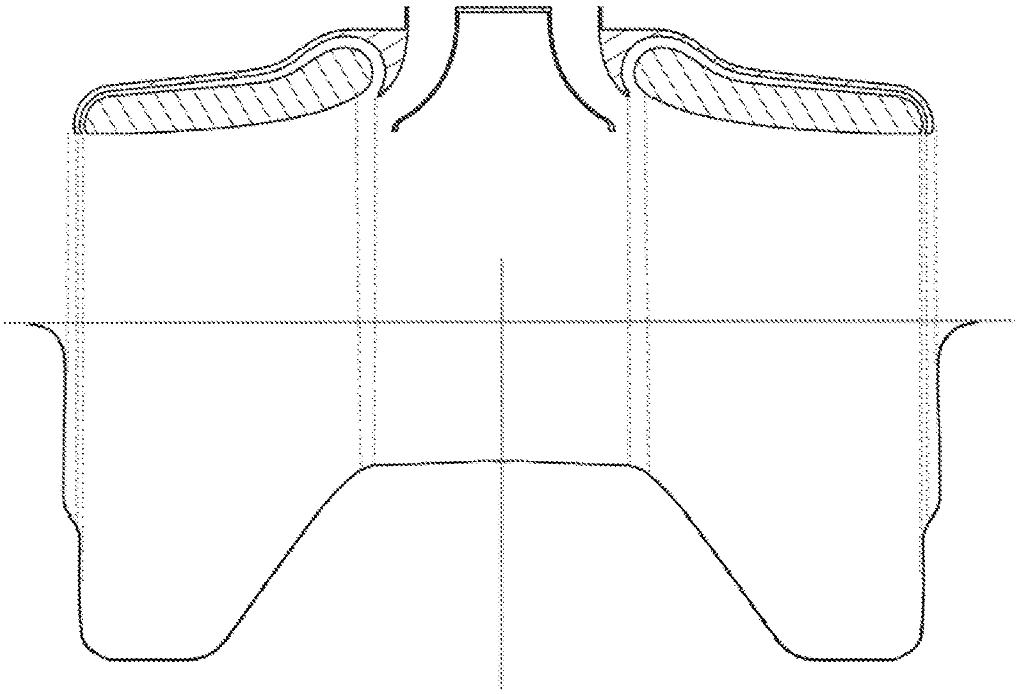
FIG. 10 shows the pressure distribution under the suction cup on a slice along the diameter.
Figure 11:
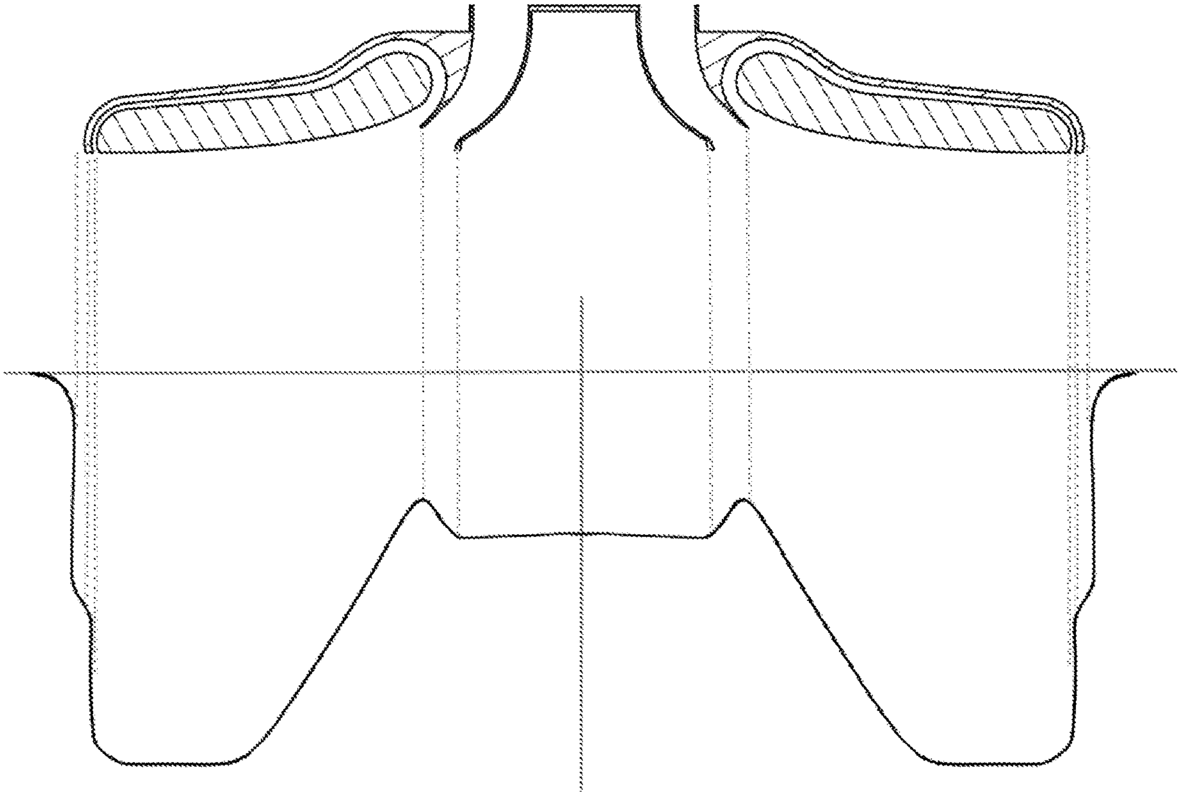
FIG. 11 shows the pressure distribution under the suction cup with a short venturi zone before flow diverter.

In one embodiment, the device uses a special flow path (arrow marks shown in FIG. 1) that has first (i) a decreasing area for fluid and then (ii) an increasing area for fluid between the inner shell and the sucked surface and flow diverter. The recycle passage creates a large area and as a result of this it increases the pressure inside the suction cup, which causes a positive pressure gradient. The resulting pressure profile under the suction cup is as shown in FIGS. 10 and 11. The main fluid flow path flowing from the outer periphery side of cup flows inside the cup chamber and at a point inside the cup chamber the main fluid flow splits into multiple flow paths (at least two), wherein at least one flow path (exit path i.e. primary flow path) follows the exhaust out of the device cup and sucked out from device by suction means and at least one flow path (recycle path i.e. secondary flow path) that follows the flow passage(s) provided inside the chamber. In one embodiment, at least one flow path (recycle path) comprises multiple flow passages either by cascaded system or by separate tubes/ducts. The result of suction fluid is the sum of fluid of primary flow path and the recycle flow path wherein, the fluid flow in primary path is only acted upon by suction means. Since the energy consumption is proportional to suction pressure as well as the volume flow rate of fluid. The reduction of flow rate through the suction means helps decrease energy consumption. Hence, the more the recycled flow, the greater is the efficiency of the suction system (efficiency is defined as suction/power for a given suction cup).

Figure 2:
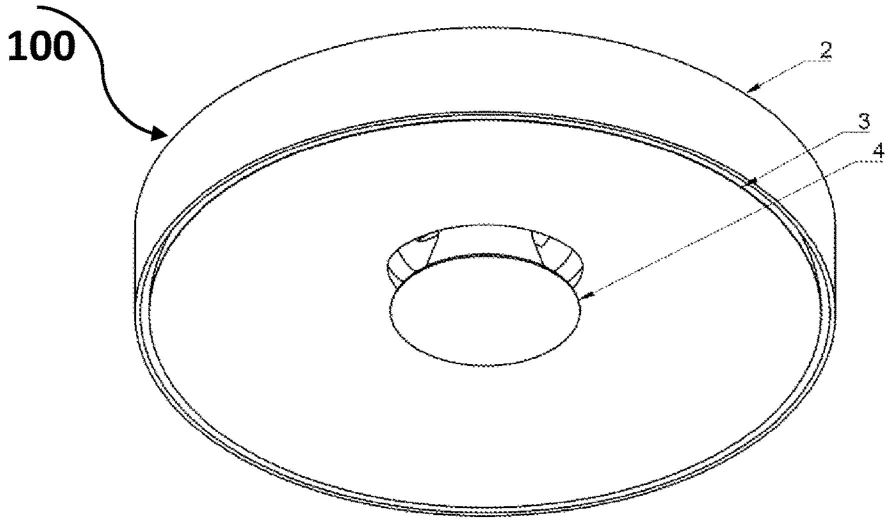
FIG. 2 shows an isometric view of the preferred embodiment I of present invention as shown in FIG. 1.

Thus, in one aspect, the invention provides a non-contact suction cup device with flow recycling which comprises one or more passage(s) (12) for fluid recycling. The above said one or more passage(s) (12) of the suction cup may comprise a single passage, or multiple passages in cascaded system, or multiple separate tubes/ducts. As stated above, the invention provides a non-contact suction cup device (100) with flow recycling system as shown in FIGS. 1-2 (Embodiment-I) which illustrates and describes the all the basic principle of the device. Following the same basic principles as provided in device (100) of FIGS. 1-2, one or more alternate embodiments can be made by structural modifications of the suction cup such as variation in shape, size, thickness, appearance; and also by varying the flow passage features inside cup chamber such as position, size, thickness, number of passages, and thus number of recycling flow paths and also fins for support. All such possible variants of device (100) are contemplated by the scope of present invention.

In the description and figures provided in present application some alternate embodiments (100*a*, 100*b*, 100*c*, 100*d*, 100*e* and 100*f*) are illustrated which all comes and contemplated within the generalized basic device embodiment (100) of FIGS. 1-2.

FIG. 1 and FIG. 2 both illustrate a non-contact suction cup device (100). FIG. 1 shows the cross-section view of one of the embodiments of present invention, which shows the basic device (100) with simplified preferred embodiment with the sucked surface (1), outer shell (2), inner shell (3), flow diverter (4) and suction means (5), the design construction and working principle of which are further described below.

FIG. 1 shows the suction device having a suction cup having one side that face the surface (1) is the front side of the device (100) and the other side of cup forms the back side of device (100) where suction means (5) is/are provided. The cup comprises outer periphery (52) and the inner enclosed area/cavity formed by cup with periphery (52) forms the suction cup chamber (51) that faces the sucked surface (1).

The suction cup includes an inner shell (3) at one side that face surface (1) and an outer shell (2) which forms the outer other side body surface of device (100). The outer shell (2) and the inner shell (3) may be sandwiched with a gap in between forming flow passage (12), which passage is formed inside the suction cup chamber (51). FIG. 1 shows a device with a single fluid flow passage (12), however multiple passages can also be provided (as illustrated in FIGS. 5-8).

The device (100) further optionally comprises one or more flow diverter (4) configured to divert the flow of fluid inside the chamber (51) and suction means (5) which may be fan(s)/impeller(s)/jet(s) that may be configured to suck or draw the fluids from the outer periphery (52) of the device into the chamber (51) of suction cup wherein the main fluid (11) splits into parts at a split point (6) and thus exit flow path (11A) and recycling flow path (11B) are formed.

The recycle fluid flow paths as provided in the present invention are novel and it makes the device of present invention more efficient. Thus, in another aspect the invention provides a method for non-contact suction cup device (100) as described above with reference to FIG. 1, wherein the method involves the device (100) and the method comprises:

providing one or more passages (12) in chamber (51), that allow a portion of suction fluid to recirculate within the chamber (51), hence causing a recycling effect on fluid used to create suction;

wherein, when the one or more suction means (5) conjugated with the suction cup is operated and function to create suction, a main fluid flow (11) from the end of outer periphery (52) enters inside the suction cup chamber (51), optionally diverted by the flow diverter (4) and at split point (6), the main fluid flow (11) splits into parts forming: a primary fluid flow path (11A) which is in direction towards the other side of suction cup wherein the part of sucked fluid is expelled out of the device via the exhaust (23); and the secondary fluid flow path (11B) which is recycling flow path through the one or more passage(s) (12).

The recycled fluid that exits out from the outlet at merge point (8) is mixed with the main fluid flow (11) stream which continues to flow and thus a portion of main suction fluid flow (11) recirculates through said one or more passage (12), and other portion of suction fluid goes outside the device through an exhaust (23) provided at the suction means attachment (13).

The present invention uses a special flow path that has first a decreasing area for fluid and then an increasing area for fluid between the inner shell (3) and the sucked surface (1) and flow diverter (4). The net cross-section for fluid increases between the point of recycle flow entry i.e., the merge point (8), and recycle flow split i.e., the split point (6). However, this is not a necessary condition especially in conditions where energy may be added to recycle fluid. The net increase in area results in a net increase in pressure. This causes a positive pressure gradient to exist in the recycle fluid tunnel hence pushing the recycle fluid around. This can also be seen in FIG. 10 and FIG. 11. The end benefit is that the fluid used to create suction is sum of recycled volume and primary volume while the fluid that is acted upon by suction means (5) is just the primary fluid. The end goal for devising an efficient suction cup is to maximize suction force while minimizing pressure and volume flow rate across fan/sucking medium.

Certain tuning to the position of recycle flow inlet i.e. split point (6) and underbody profile can also make the invention make a stable suction force and devices resulting from such tuning are contemplated within the scope of FIG. 1 and present invention. Stable suction means suction force is maximum at a given gap between the sucked surface and the suction cup. Slight decrease in the gap or increase in the gap both result in decrease in suction. This can be used to design all sorts of climbers including some that can hover over an inverted surface much like a superconductor while only using passive fluid dynamic effects from a single fan or source, while maintaining appreciable energy efficiency.

FIG. 2 shows the isometric view of suction device (100) as shown in FIG. 1 and as described above. As can be seen in FIG. 2, the non-contact suction cup device (100) with flow recycling includes an outer shell (2), an inner shell (3) and a flow diverter (4) configured to divert the flow of fluid. The device (100) shown is circular shape comprising a circular periphery (52), however other shapes are possible and are contemplated within the scope.

Figure 3:
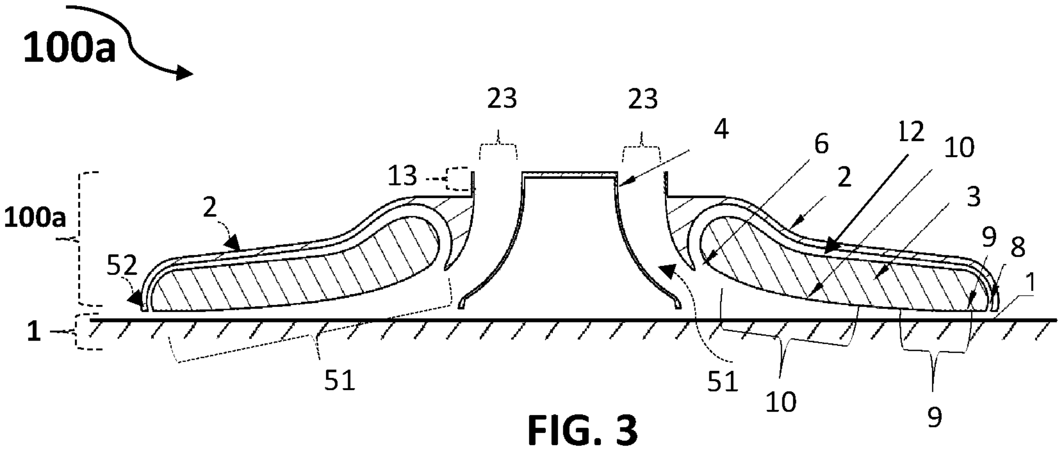
FIG. 3 shows the cross-section view of the Non-Contact Suction Cup Device (100*a*) which represents an alternate preferred embodiment (Embodiment-II) with more complex flow pattern.
Figure 4:
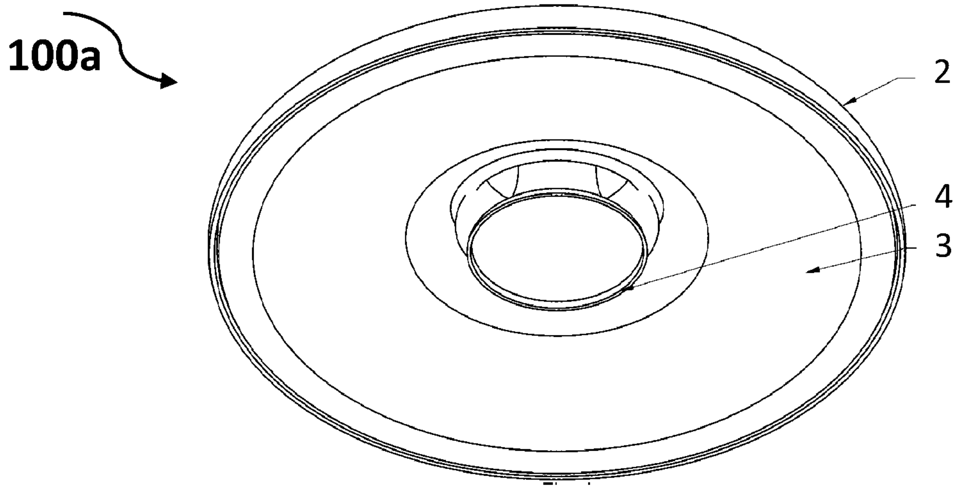
FIG. 4 shows the isometric view of the alternate preferred embodiment II of present invention as shown in FIG. 3.
Figure 5A:
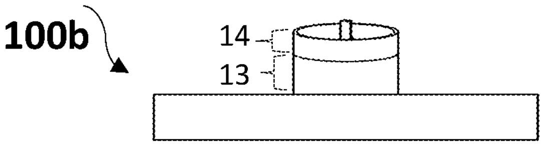
FIGS. 5(*a*-*g*) shows different views of a suction cup device (100*b*) which represents an alternate embodiment (Embodiment-III) of suction cup device (100) as described above for FIGS. 1-2.
Figure 5B:
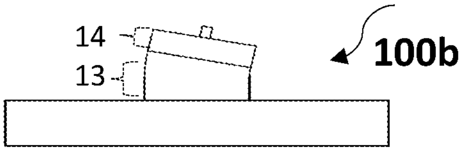
Figure 5E:
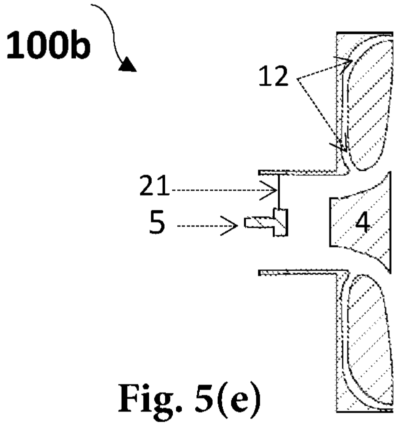
Figure 5C:
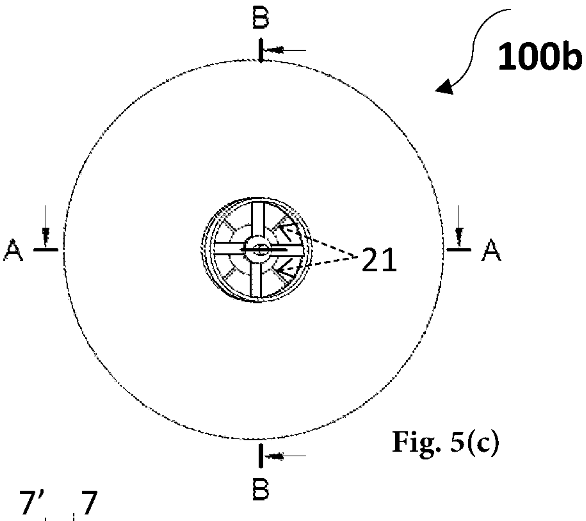
Figure 5D:
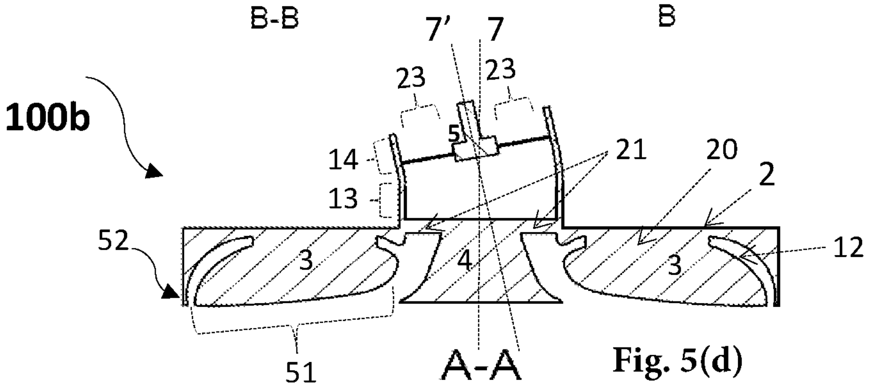
Figure 5F:
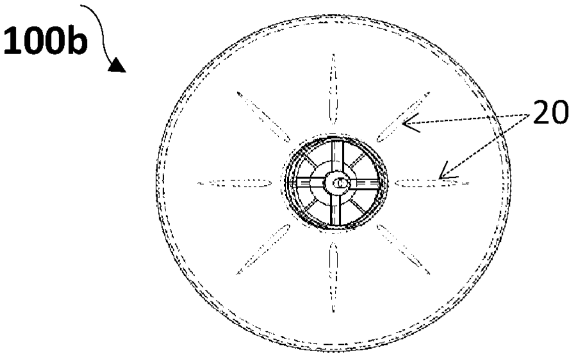
Figure 5G:
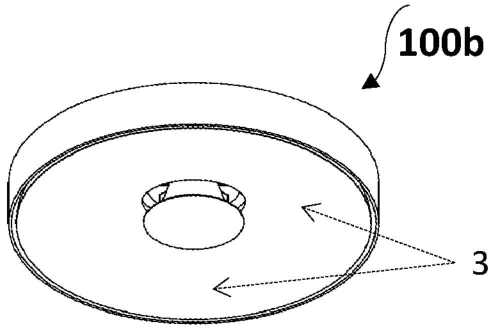

FIG. 3 and FIG. 4 illustrate a non-contact suction cup device (100*a*) of embodiment II of present invention, which is an alternate preferred embodiment.

FIG. 3 shows the schematic cross section view of the device (100*a*) of the present invention, with more complex flow pattern to help minimize the thickness of the system. This also demonstrates one kind of flow passage (12) shape variation. In the basic design shown in FIG. 1, the suction cup is quite thick and bulky, which can be modified to a thinner suction cup design as shown in FIG. 3, by changing the path of the recycle flow passage (12). Similar to device (100), this alternate embodiment device (100*a*) also comprises a suction cup, outer periphery (52) and a cup chamber (51) formed therein that face a surface (1) to be sucked.

As can be seen the suction cup near to the central axis of the device (100*a*) is thick similar to device (100) of FIG. 1, but the thickness of suction cup has gradually been decreased towards outer periphery (52), Additionally, FIG. 3 shows acceleration zone (9), and a diffusion zone (10). Embodiment II also includes suction means (5) which are not shown in FIG. 3, however any type of suction means can be used. Further as can be seen in FIG. 3, the inlet to the recycled flow passage (12) is placed at a point much earlier in the flow path within the chamber (51). Changing the position of the inlet of the reflow path can change many characteristics of the system like the efficiency, stability, sensitivity to surface height etc.

The basic principle, working and operation and flow paths of fluid (11) of this device (100*a*) is same as described above for device (100) of FIG. 1. Fundamental to the working of the recycled flow concept is increasing air pressure to a higher value at the inlet to recycled flow passage, relative to the pressure at the outlet to the recycled flow passage. However, this does not mean that the flow pressure must continuously increase between the outlet of the recycle passage and the inlet, in fact higher efficiency is achieved if the flow pressure is first decreased and then increased to a higher value. In the embodiment II of FIG. 3 here first reduces pressure in the acceleration zone (9) and then finally increases pressure in the diffusion zone (10). Alternatively, one may create a system where there are a number of regions with increasing and decreasing fluid area but net overall area increase, such a device will also work, albeit with less efficiency and is covered in the scope of this patent.

FIG. 4 shows the isometric view of device (100*a*) as shown in FIG. 3 and as described above. In FIG. 4, the suction cup device (100*a*) with flow recycling includes an outer shell (2), an inner shell (3) and a hollow flow diverter (4) configured to divert the flow of fluid.

FIG. 5 shows different views (a-g) of a suction cup device (100*b*) with alternate recycle passage shape, which is an alternate embodiment of suction cup device (100) as described above for FIGS. 1-2.

FIG. 5(*a*) shows the partial back view of suction cup device (100*b*), FIG. 5(*b*) shows the side view of suction cup device (100*b*), FIG. 5(*c*) shows the top view of suction cup device (100*b*). FIG. 5(*d*) shows the section view of FIG. 5(*c*) along plane A-A, and FIG. 5(*e*) shows the section view across plane B-B. FIG. 5(*f*) shows another top view of the suction cup device (100*b*) of same device as shown in FIG. 5(*c*) but here it is shown with all hidden features shown in dotted lines such as fins (20). This clearly shows how plurality of fins (20) are placed inside recycling passage (12). FIG. 5(*g*) shows the isometric view of the suction cup device (100*b*) as shown in FIG. 5(*a-b*) and FIG. 5(*f*).

In FIG. 5(*d*), the suction device (100*b*) [similarly Device 100 of FIG. 1 and Device 100*a* of FIG. 3] comprises: a suction cup with an outer shell (2), inner shell (3), optionally flow diverter (4), suction means (5); a chamber (51) formed at one side of the suction cup, that faces a surface (1) to be sucked (surface not shown) by action of fluid flow enabling adherence of the suction cup device (100*b*) onto the surface (1), and the other side of the suction cup forms the outer shell (2) of the device. The chamber (51) of the suction cup comprises one passage (12) [In Fig, only one passage is shown, but more numbers of passage can be made, which is contemplated within the embodiment] that allow a portion of suction fluid to recirculate within the chamber (51) which causes a recycling effect on fluid used to create suction.

As shown in FIG. 5(*d*) and FIG. 5(*f*), the suction cup device (100*b*) comprises recycling fluid flow passage (12)

which comprises/involves fin like structures (20) within the recycle passage which provide support to the inner shell (3). In some embodiments, such fin like structures (20) are practically almost always needed since the inner shell (3) cannot just float in mid-air inside the suction cup chamber (51). For efficiency sake these fins (20) can be made in an airfoil like shape.

Other features that can been seen in the figures such, FIG. 5(*d*) shows the attachments for flow diverter (4). This too cannot be floating in mid-air and hence needs support such as fins (21) to connect to the suction means attachment (13) or outer shell (2) of the suction cup device (100*b*) as specifically shown in FIG. 5(*c-d-e*) in an exemplary representation.

Further the said suction means (5) can be placed at the other side (2) of the device at any place suitable and/or capable of creating suction, either by direct integration/attachment with the body of the suction cup device at exhaust (23), or indirectly attachment with the suction means attachment (13), or more indirectly via or within pipe (14) attached to the suction means attachment (13). In the indirect placement, the suction means (5) may be placed away from the body of the suction cup device exhaust (23) by using suction pipe (14) which may be flexible pipe, wherein one or more suction means (fans/jets) is/are placed within the pipeline (of 14) and one end of the pipe (14) is attached with the suction means attachment (13) at the other side exhaust (23) of the device. This may be implemented in all the device variations including those shown in FIGS. 1-7.

Further the suction means (5) such as one or more fan or jet or combination thereof can be mounted either coaxial along the central axis line (7) of device (100) as shown in FIG. 1, or off-axis to central axis line (7) of the suction cup device as shown in FIGS. 5(*b*) and 5(*d*), which particularly show a suction means (5) such as a fan mounted off-axis, wherein as can be seen the suction cup device comprises central vertical axis (7) and the suction means (5) comprising it's central vertical axis (7') is placed at exhaust (23), and wherein device axis (7) and fan/jet axis (7') forms an angle between them, which represents off-axis placement of suction means (5) with respect to device (100*b*). Thus, both coaxial and off-axial placement of suction means (5) is possible in the suction device (100) of the present invention as shown in FIG. 1 (in one embodiment) and its alternate embodiments (Devices 100*a*, 100*b*, 100*c*, 100*d*) as shown in FIGS. 3-7.

Figure 6:
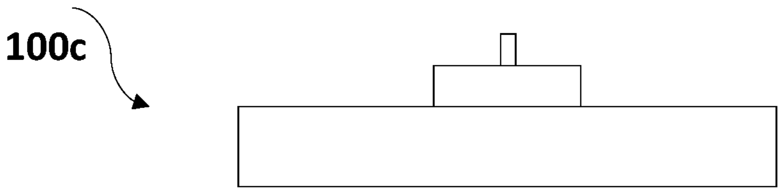
FIGS. 6(*a*-*c*) shows device (100*c*) which is another embodiment (Embodiment-IV) of suction device (100) of present invention with cascaded recycling passages.
Figure 6:
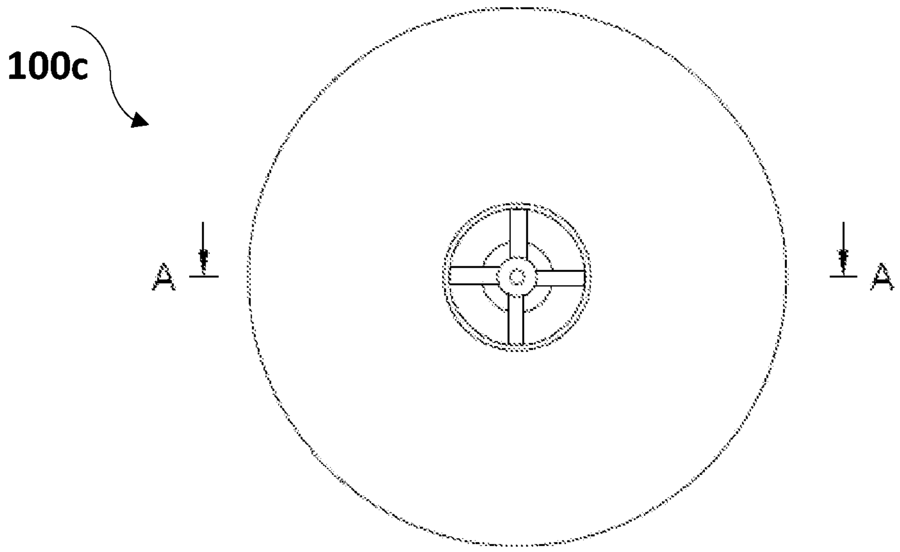
Figure 6:
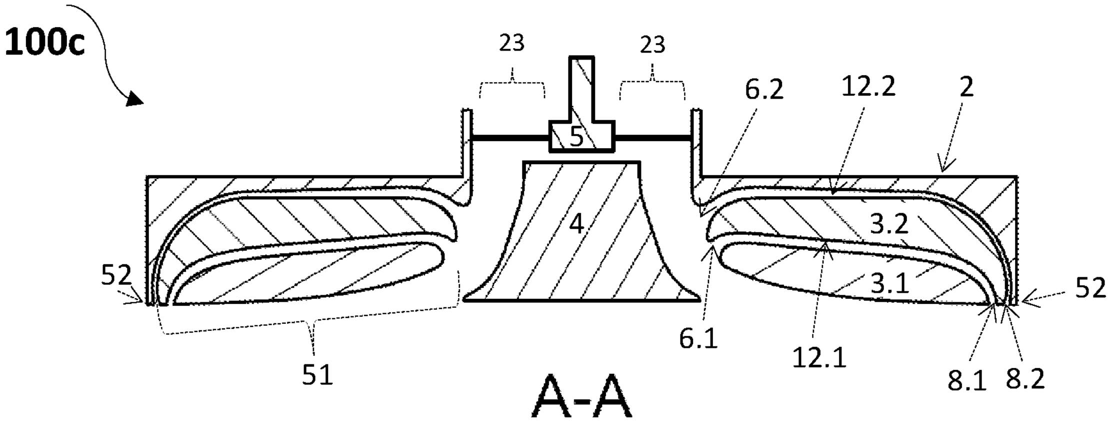
Figure 7A:
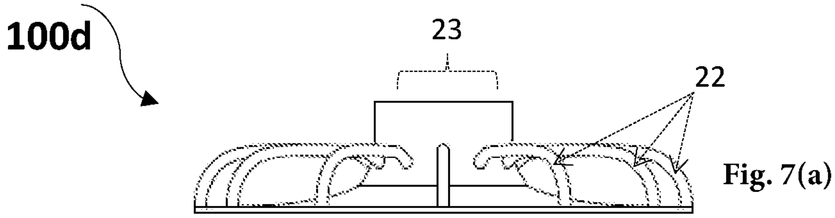
FIGS. 7(*a*-*d*) shows device (100*d*) which is an alternate embodiment (Embodiment-V) of suction device (100) of present invention with separate tubes/ducts (22) used to create recycling flow passage (12).
Figure 7B:
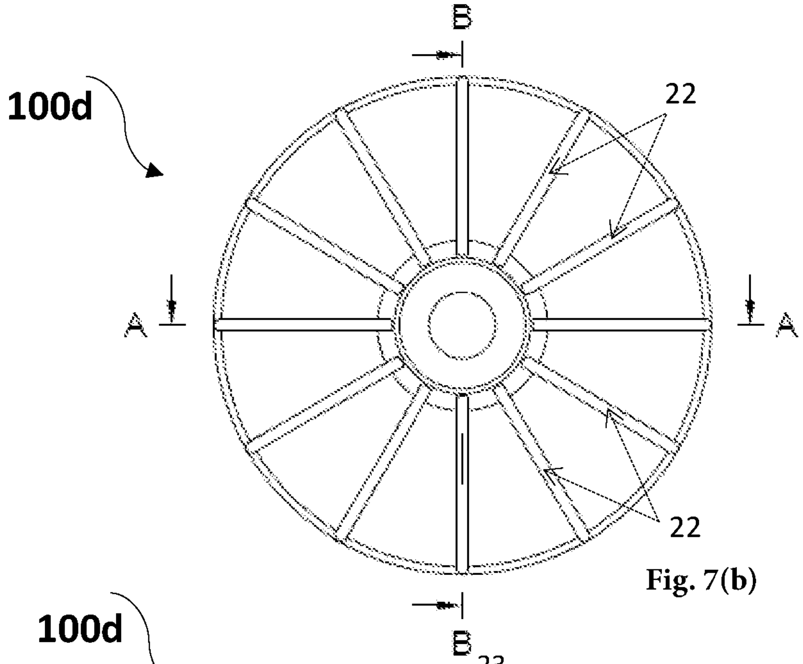
Figure 7D:
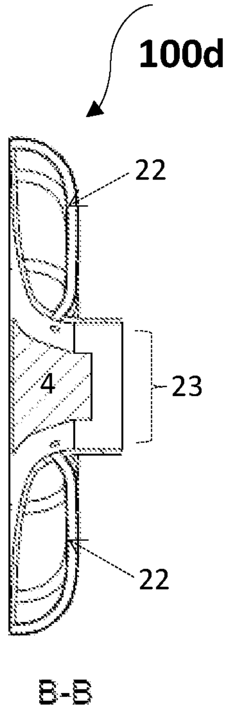
Figure 7C:
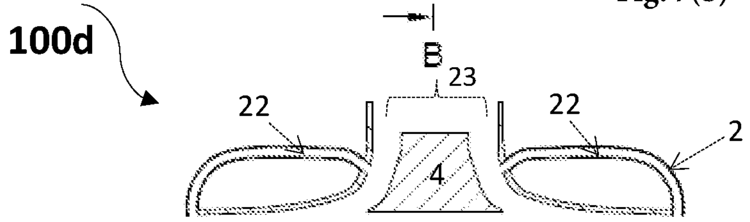

In one embodiment, in a design variation, a cascaded system can be employed with multiple recycling passages one within the other as shown in example FIG. 6 which shows device (100*c*) which is another embodiment of suction device (100). FIG. 6(*a*) shows the side view, FIG. 6(*b*) shows the top view, and FIG. 6(*c*) shows the section view along A-A of FIG. 6(*b*). Referring FIG. 6(*c*), it shows a device with multiple flow passages (12) wherein the suction cup comprises first flow passage (12.1) and second flow passage (12.2). The inner shell (3) comprises first inner shell portion (3.1) and second inner shell portion (3.2). The first flow passage (12.1) is formed in between first inner shell portion (3.1) and second inner shell portion (3.2), and comprises first fluid recycle inlet at first split point (6.1), and first fluid outlet at first merge point (8.1). The second flow passage (12.2) is formed in between the outer shell (2) and second inner shell portion (3.2), and comprises second fluid recycle inlet at second split point (6.2), and second fluid outlet at second merge point (8.2).

The fluid flow passage (12) with cascaded system can be of two types. One is where the split point (6.1) comes before split point (6.2) and the merge points (8.2) comes before merge point (8.1) (Fluid flow going from out of the suction cup to the inside of the suction cup). The other type of cascaded system is where the split point (6.1) comes before the split point (6.2) and merge point (8.1) comes before the merge point (8.2) (not shown in a drawing).

FIG. 7 shows device (100*d*) which is an alternate embodiment of suction device (100) of present invention with separate tubes/ducts (22) used to create recycling flow passage (12). FIG. 7(*a*) shows a side view, 7(*b*) shows a back view, FIG. 7(*c*) shows a section view along A-A of FIG. 7(*b*) and FIG. 7(*d*) shows a section view with features beyond section plane visible, wherein all these figures are showing the feature of a plurality of separate tubes/ducts (22) are spatially distributed, wherein each tube/duct (22) forms a passage (12) with inlet and outlet for recycling of fluid.

Figure 8:
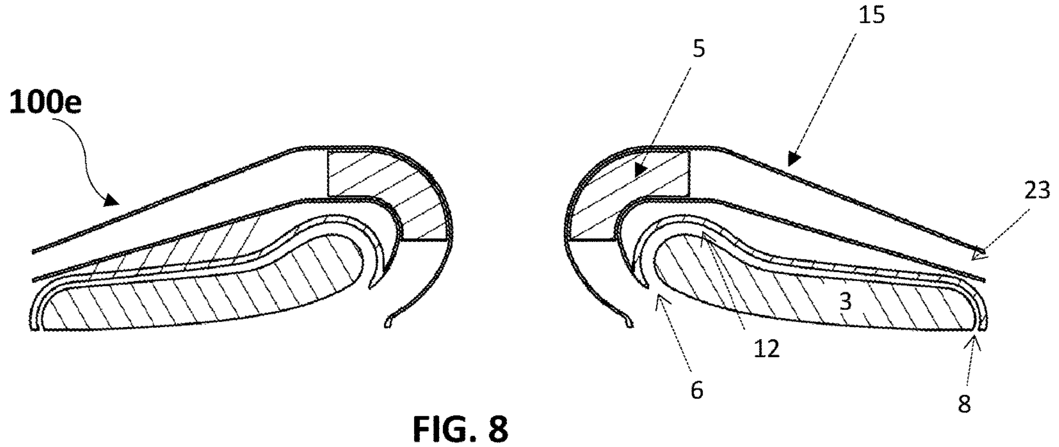
FIG. 8 shows device (100*e*) which is an alternate embodiment (Embodiment-VI) of suction device (100) of present invention with an additional special exhaust duct (15) which exhaust the fluid to a location close to the inlet of the suction cup.

In one embodiment, in a design variation, a device can be employed with an additional special exhaust duct (15) which exhausts the fluid to a location close to the inlet of the suction cup as shown in example FIG. 8 which shows device (100*e*) which is another embodiment of suction device (100). FIG. 8 shows the section view of the suction device 100*e*. As mentioned above, when the one or more suction means (5) conjugated with the suction cup is operated and function to create suction, a main fluid flow (11) (as shown in FIG. 1) from the end of outer periphery enters inside the suction cup chamber and at split point (6) and splits into a primary fluid flow path (11A) which is passed through the duct (15) wherein the part of sucked fluid is expelled out of the device via the exhaust (23); and the secondary fluid flow path (11B) which is recycling flow path through the one or more passage(s) (12). The recycled fluid that exits out from the outlet at merge point (8) is mixed with the main fluid flow (11) stream which continues to flow and thus a portion of main suction fluid flow (11) recirculates through said one or more passage (12), and other portion of suction fluid goes outside the device through an exhaust (23). Referring FIG. 8, it shows a device where the primary flow path 11A (as shown in FIG. 1) is formed inside the duct (15) i.e. the primary flow path flows out the portion of suction fluid outside the device through exhaust (23). The secondary fluid flow path (11B) (as shown in FIG. 1) recirculates the portion of suction fluid through passage (12) formed in between inner shell portion (3) and inner side of the duct (15). Further, the placement of duct (15) does not have any major influence on the performance but makes the suction cup incredibly compact and self-contained. The suction means (5) used for such a suction cup is preferably a centrifugal style blower/impeller.

Figure 9A:
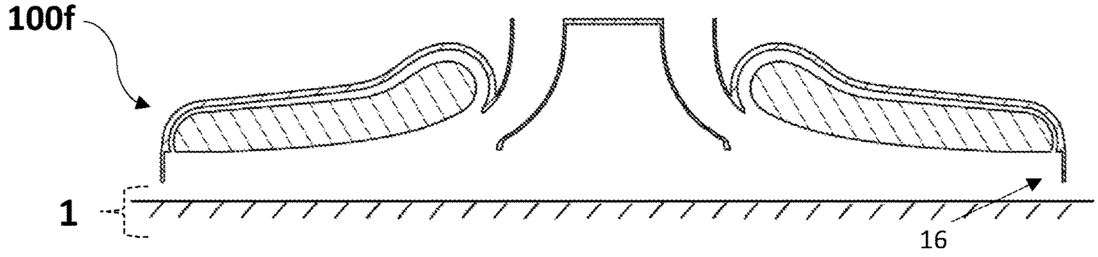
FIG. 9*a* shows device (100*f*) which is an alternate embodiment (Embodiment-VII) of suction device (100) of present invention with an additional flexible skirt (16) to enable the suction cup to scale larger obstacles.
Figure 9B:
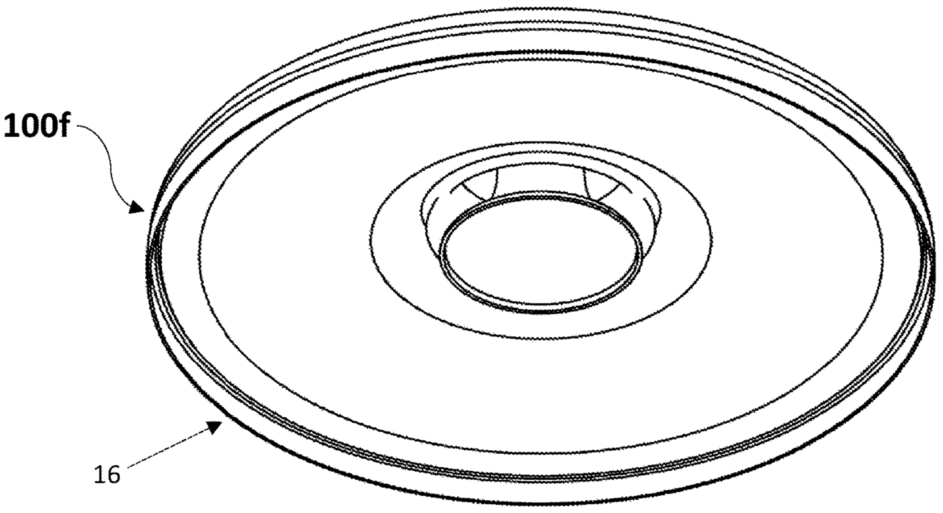
FIG. 9*b* shows an isometric view of the preferred embodiment VII of present invention as shown in FIG. 9*a*.

FIG. 9*a* shows the cut section view of device (100*f*) which is an alternate embodiment of suction device (100) of present invention with an additional flexible skirt (16) around the periphery of the suction cup. This flexible skirt works in a fashion similar to a hovercraft skirt and helps increase the size of obstacles that this suction system can scale. This skirt (16) collapses around a large obstacle hence allowing the suction system to go over larger obstacles than the gap between the suction cup and the sucked surface, while continuing to use advantages offered by flow recycling. The flow recycling effect which is the main novel feature of this invention functions well even in this configuration and helps improve suction efficiency. FIG. 9*b* shows the isometric view of suction device (100*f*) as shown in FIG. 9*a* and as described above.

The advantage of the present invention is increased energy efficiency over the traditional non-contact suction methods mentioned in the prior arts in the background section. The system also has lower acoustic noise compared to systems like U.S. Pat. No. 10,670,046 B2 as it does not have a turbulence zone that creates turbulence and noise. This design also becomes increasingly better than most common systems when designed to work at a higher clearance from sucked surface.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A non-contact suction cup device with flow recycling, wherein the non-contact suction cup device comprises:

a suction cup with an outer shell;

optionally, one or more flow diverter(s);

one or more suction means;

a chamber formed at one side of the suction cup, facing a surface to be sucked by action of fluid flow enabling adherence of the non-contact suction cup device onto the surface, and other side of the suction cup forms the outer shell of the non-contact suction cup device;

wherein the chamber of the suction cup comprises one or more passage(s) that allow a portion of suction fluid to recirculate within the chamber, hence causing a recycling effect on fluid used to create suction;

wherein, the passage comprises one or more split point(s) inside the chamber that acts as fluid inlet of the passage, and one or more merge point(s) at an outer periphery of the chamber that acts as fluid outlet of the passage;

wherein, in operation of the non-contact suction cup device, a main fluid flow from the outer periphery enters inside the chamber and at said split point, the main fluid flow splits into parts forming:

(i) a secondary fluid flow path that recirculates said portion of suction fluid through said one or more passage(s), and (ii) a primary fluid flow path that flows out other portion of suction fluid outside the non-contact suction cup device through an exhaust.

2. The non-contact suction cup device as claimed in claim 1, wherein the one or more split point(s) of the one or more passage(s) within the chamber is/are provided in place(s)/position(s) in between the suction means and the merge point.

3. The non-contact suction cup device as claimed in claim 1, wherein the one or more passage(s) of the suction cup comprises:

a single passage, or multiple passages in cascaded system, or multiple separate tubes/ducts.

4. The non-contact suction cup device as claimed in claim 3, wherein the one or more passage(s) of the suction cup comprises: one or more flow passage gap(s) formed in between the outer shell and an inner shell, wherein the outer shell and the inner shell are sandwiched with a gap in between.

5. The non-contact suction cup device as claimed in claim 3, wherein the one or more passage(s) of the suction cup comprises multiple cascaded flow passages, wherein the inner shell comprises a first inner shell portion and a second inner shell portion, and wherein, a first flow passage is formed in between the first inner shell portion and the second inner shell portion, and comprises a first fluid recycle inlet at a first split point, and a first fluid outlet at a first merge point;

a second flow passage is formed in between the outer shell and the second inner shell portion, and comprises a second fluid recycle inlet at a second split point, and a second fluid outlet at a second merge point.

6. The non-contact suction cup device as claimed in claim 3, wherein the one or more passage(s) of the suction cup comprises separate tubes/ducts used to create a recycling flow passage.

7. The non-contact suction cup device as claimed in claim 1, wherein the non-contact suction cup device further comprises of an additional exhaust duct which redirects an exhaust fluid from the suction means to a location close to an inlet of the non-contact suction cup device, wherein the suction means is centrifugal style blower or impeller.

8. The non-contact suction cup device as claimed in claim 1, wherein the non-contact suction cup device further comprises of an additional flexible skirt around the outer periphery of the suction cup, wherein the skirt collapses around a large obstacle allowing the non-contact suction cup device to go over larger obstacles than the gap between the suction cup and the sucked surface.

9. The non-contact suction cup device as claimed in claim 1, wherein, the one or more suction means comprises one or more apparatus capable of creating suction when conjugated with the suction cup, and are configured to suck or draw a fluid from the outer periphery of the non-contact suction cup device into the chamber of the suction cup; and a flow diverter is provided inside the chamber and configured to divert a flow of the fluid flowing below the inner shell starting from a region from the outer periphery to a region between the inner shell and the flow diverter.

10. The non-contact suction cup device as claimed in claim 1, wherein the non-contact suction cup device first reduces pressure in an acceleration zone and then finally increases pressure in a diffusion zone.

11. The non-contact suction cup device as claimed in claim 1, wherein a fluid comprises air or liquid or slurries or any mixture thereof capable to create pressure and suction.

12. The non-contact suction cup device as claimed in claim 1, wherein a shape of the suction cup is selected from the group consisting of circular, oval and polygonal.

13. The non-contact suction cup device as claimed in claim 1, wherein said one or more suction means is/are apparatus capable of creating suction, selected from the group consisting of a fan, and a jet, is conjugated with the suction cup either by:

(a) direct attachment, by attaching the suction means with a suction means attachment of the suction cup, or (b) indirect attachment, wherein the suction means is provided in a suction pipe or tubular means and then conjugating a suctioning end of the suction pipe or tubular means with the suction means attachment;

and wherein the suction means can be placed in any orientation with respect to the non-contact suction cup device.

14. The non-contact suction cup device as claimed in claim 1, wherein, a recycling fluid flow passage may comprise one or more fins within a recycle passage which provide support to an inner shell;

the flow diverter may comprise one or more support fin(s) to connect to a suction means attachment or the outer shell of the non-contact suction cup device.

15. The non-contact suction cup device as claimed in claim 1, wherein one or more recycled-flow passages may be provided with fan(s) and/or jet(s) to add momentum to a recycling flow wherein the fans/jets may use an external source or comprises holes linking the recycle passage to an environment hence using a lower pressure in the recycle passage to drive the fans/jets.

16. A method for non-contact suction using a non-contact suction cup device, wherein the method comprises:

providing one or more passage(s) in a chamber of a suction cup, that allow a portion of suction fluid to recirculate within the chamber, hence causing a recycling effect on fluid used to create suction;

wherein, when one or more suction means conjugated with the suction cup is operated and function to create suction, a main fluid flow from the outer periphery enters inside the chamber, diverted by a flow diverter and at a split point, the main fluid flow splits into parts forming:

(i) a secondary fluid flow path, wherein a portion of fluid enters into the passage via an inlet at the split point, flowing therethrough exits out from the passage via an outlet at a merge point where said portion of fluid merges, and is mixed with the main fluid flow which continues to flow and thus a portion of main suction fluid flow recirculates through said one or more passage(s); and (ii) a primary fluid flow path that flows out other portion of suction fluid outside the non-contact suction cup device through an exhaust provided at a suction means attachment.

17. The method as claimed in claim 16, wherein the one or more passage(s) of the suction cup comprises:

a single passage, or multiple passages in cascaded system, or multiple separate tubes/ducts.

* * * * *